(12) United States Patent
Liu et al.

(10) Patent No.: US 10,877,000 B2
(45) Date of Patent: Dec. 29, 2020

(54) FATIGUE LIFE ASSESSMENT

(71) Applicant: SCHLUMBERGER TECHNOLOGY CORPORATION, Sugar Land, TX (US)

(72) Inventors: Zhanke Liu, Sugar Land, TX (US); Michael Hayes Kenison, Richmond, TX (US); Gregory Campbell, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/060,456

(22) PCT Filed: Dec. 8, 2016

(86) PCT No.: PCT/US2016/065495
§ 371 (c)(1),
(2) Date: Jun. 8, 2018

(87) PCT Pub. No.: WO2017/100387
PCT Pub. Date: Jun. 15, 2017

(65) Prior Publication Data
US 2018/0356365 A1 Dec. 13, 2018

Related U.S. Application Data

(60) Provisional application No. 62/265,350, filed on Dec. 9, 2015.

(51) Int. Cl.
*G01N 27/90* (2006.01)
*G01N 27/82* (2006.01)
*E21B 19/22* (2006.01)

(52) U.S. Cl.
CPC ......... *G01N 27/9033* (2013.01); *G01N 27/82* (2013.01); *G01N 27/9026* (2013.01); *E21B 19/22* (2013.01)

(58) Field of Classification Search
CPC ............ G01N 27/904; G01N 27/9033; G01N 27/902; G01N 27/9026; G01N 27/82;
(Continued)

(56) References Cited

U.S. PATENT DOCUMENTS 3,940,689 A * 2/1976 Johnson, Jr. ......... G01N 27/904
324/221
4,636,727 A 1/1987 Kahil et al.
(Continued)

FOREIGN PATENT DOCUMENTS

EP 2725352 A1 4/2014
JP H09-318586 A 12/1997
(Continued)

OTHER PUBLICATIONS

International Search Report and Written Opinion issued in International Patent Appl. No. PCT/US2016/065495 dated Mar. 29, 2017; 16 pages.
(Continued)

*Primary Examiner* — Patrick Assouad
*Assistant Examiner* — Sean Curtis
(74) *Attorney, Agent, or Firm* — Rodney Warfford

(57) ABSTRACT

A technique facilitates prediction of run life. Data relating to a pipe defect is provided to a data processing system for comparison to stored data regarding defects. Additionally, data regarding fatigue life accumulation is stored on the data processing system as it relates to fatigue life of the pipe based on the number of cycles to failure of the pipe without the presence of the defect. The number of cycles experienced by the pipe at the time the defect occurs in the pipe also is determined and provided to the data processing system. The system and methodology further comprise using the data regarding the defect type, the fatigue life accumulation data for the pipe, and the number of cycles
(Continued)

experienced by the pipe at the time of the defect to estimate a remaining number of cycles until failure of the pipe.

20 Claims, 9 Drawing Sheets

(58) Field of Classification Search
CPC ............. G01N 27/90; G01N 2203/006; G01N 2203/0073; E21B 19/22
USPC .......................... 324/220–221, 228, 240, 242
See application file for complete search history.

(56) References Cited

U.S. PATENT DOCUMENTS

| | | | | |
|---|---|---|---|---|
| 4,675,604 | A | 6/1987 | Moyer et al. | |
| 4,704,580 | A | 11/1987 | Moake et al. | |
| 5,090,039 | A | 2/1992 | Gard et al. | |
| 5,303,592 | A | 4/1994 | Livingston | |
| 5,323,856 | A | 6/1994 | Davis et al. | |
| 5,461,313 | A | 10/1995 | Bohon et al. | |
| 5,581,037 | A * | 12/1996 | Kwun | G01N 29/14 73/623 |
| 5,793,200 | A | 8/1998 | Berrill | |
| 5,826,654 | A | 10/1998 | Adnan et al. | |
| 5,914,596 | A | 6/1999 | Weinbaum | |
| 6,023,986 | A | 2/2000 | Smith et al. | |
| 6,205,869 | B1 * | 3/2001 | Schadt | G01N 1/14 73/863.71 |
| 6,241,028 | B1 | 6/2001 | Bijleveld et al. | |
| 6,316,937 | B1 * | 11/2001 | Edens | G01N 27/82 324/220 |
| 6,321,596 | B1 | 11/2001 | Newman | |
| 6,404,189 | B2 * | 6/2002 | Kwun | G01N 22/00 324/220 |
| 6,820,653 | B1 | 11/2004 | Schempf et al. | |
| 6,967,478 | B2 * | 11/2005 | Wayman | G01N 27/82 324/235 |
| 7,163,055 | B2 | 1/2007 | Coon et al. | |
| 7,347,261 | B2 | 3/2008 | Markel et al. | |
| 7,357,179 | B2 | 4/2008 | Zheng et al. | |
| 7,414,395 | B2 * | 8/2008 | Gao | G01N 27/82 324/220 |
| 7,783,432 | B2 * | 8/2010 | Orth | G01N 27/9026 702/38 |
| 8,049,494 | B2 * | 11/2011 | Lepage | G01N 27/9013 324/222 |
| 8,086,425 | B2 | 12/2011 | Papadimitriou et al. | |
| 8,428,910 | B2 | 4/2013 | Papadimitriou et al. | |
| 8,542,127 | B1 * | 9/2013 | Goroshevskiy | G01N 27/82 340/657 |
| 9,176,096 | B2 * | 11/2015 | Goroshevskiy | G01N 27/82 |
| 9,322,805 | B2 * | 4/2016 | Koka | G01N 27/83 |
| 9,581,567 | B2 * | 2/2017 | Goroshevskiy | G01N 27/82 |
| 9,671,371 | B2 * | 6/2017 | Liu | G01N 27/83 |
| 9,964,519 | B2 * | 5/2018 | Goroshevskiy | B64C 39/024 |
| 10,247,657 | B2 * | 4/2019 | Allen | G01N 17/006 |
| 10,288,583 | B2 * | 5/2019 | Chang | G01V 3/28 |
| 10,317,331 | B2 * | 6/2019 | Guner | G01N 17/02 |
| 10,330,641 | B2 * | 6/2019 | Goroshevskiy | G01N 27/72 |
| 2001/0017541 | A1 * | 8/2001 | Kwun | G01N 29/265 324/240 |
| 2001/0022514 | A1 | 9/2001 | Light et al. | |
| 2001/0029989 | A1 | 10/2001 | Paz | |
| 2003/0052670 | A1 | 3/2003 | Miszewski | |
| 2003/0098697 | A1 | 5/2003 | Tanaka | |
| 2003/0118230 | A1 | 6/2003 | Song et al. | |
| 2003/0164053 | A1 | 9/2003 | Ignagni | |
| 2003/0173072 | A1 | 9/2003 | Vinegar et al. | |
| 2004/0095137 | A1 | 5/2004 | Kwun et al. | |
| 2004/0103121 | A1 | 5/2004 | Johnson et al. | |
| 2004/0205727 | A1 | 10/2004 | Sit et al. | |
| 2004/0216512 | A1 | 11/2004 | Kwun et al. | |
| 2005/0046591 | A1 | 3/2005 | Pacault et al. | |
| 2005/0242169 | A1 | 11/2005 | Michal | |
| 2006/0055584 | A1 | 3/2006 | Waite et al. | |
| 2006/0096753 | A1 | 5/2006 | Zheng et al. | |
| 2006/0184714 | A1 | 8/2006 | Dang et al. | |
| 2006/0202685 | A1 | 9/2006 | Barolak et al. | |
| 2006/0202686 | A1 | 9/2006 | Barolak et al. | |
| 2006/0247868 | A1 | 11/2006 | Brandstrom | |
| 2006/0254373 | A1 | 11/2006 | Boudreaux | |
| 2007/0150084 | A1 | 6/2007 | Grubb et al. | |
| 2007/0222436 | A1 * | 9/2007 | Gao | G01N 27/82 324/220 |
| 2007/0222438 | A1 | 9/2007 | Reeves | |
| 2008/0106260 | A1 | 5/2008 | Rogers | |
| 2008/0228412 | A1 * | 9/2008 | Orth | G01N 27/82 702/38 |
| 2009/0243604 | A1 | 10/2009 | Dutta et al. | |
| 2010/0131209 | A1 | 5/2010 | Pacelli | |
| 2010/0131450 | A1 | 5/2010 | Nguyen et al. | |
| 2011/0191045 | A1 | 8/2011 | Boenisch | |
| 2012/0130651 | A1 | 5/2012 | Papadimitriou et al. | |
| 2013/0057269 | A1 * | 3/2013 | Koka | G01N 27/83 324/240 |
| 2013/0060487 | A1 | 3/2013 | Papadimitriou et al. | |
| 2013/0124109 | A1 | 5/2013 | Denenberg et al. | |
| 2014/0088889 | A1 | 3/2014 | Duckworth | |
| 2014/0107947 | A1 | 4/2014 | Papadimitriou et al. | |
| 2014/0200831 | A1 | 7/2014 | Smith et al. | |
| 2014/0207390 | A1 * | 7/2014 | Zheng | E21B 19/22 702/34 |
| 2014/0327443 | A1 | 11/2014 | Liu et al. | |
| 2014/0368191 | A1 * | 12/2014 | Goroshevskiy | G01N 27/82 324/201 |
| 2015/0061659 | A1 | 3/2015 | Freear et al. | |
| 2015/0377012 | A1 * | 12/2015 | Liu | G01N 27/83 702/6 |
| 2016/0231278 | A1 * | 8/2016 | Goroshevskiy | G01L 1/12 |
| 2016/0231279 | A1 | 8/2016 | Hoyt | |
| 2016/0231280 | A1 | 8/2016 | Zwanenburg et al. | |
| 2016/0252481 | A1 * | 9/2016 | Zheng | G01N 27/82 324/238 |
| 2017/0122309 | A1 | 5/2017 | Kusumba et al. | |
| 2017/0122909 | A1 * | 5/2017 | Goroshevskiy | G01M 5/0025 |
| 2017/0241953 | A1 * | 8/2017 | Kagawa | G01N 27/82 |
| 2017/0261469 | A1 * | 9/2017 | Chang | E21B 47/00 |
| 2017/0322182 | A1 * | 11/2017 | Zheng | G01R 33/09 |
| 2017/0350864 | A1 * | 12/2017 | Goroshevskiy | G01L 1/125 |
| 2017/0372704 | A1 | 12/2017 | Papadimitriou et al. | |
| 2018/0106762 | A1 * | 4/2018 | Boenisch | G01N 27/902 |
| 2018/0149552 | A1 * | 5/2018 | Wayman | G01M 3/40 |
| 2018/0188207 | A1 | 7/2018 | Freear et al. | |
| 2018/0196005 | A1 * | 7/2018 | Fanini | E21B 47/007 |
| 2018/0266992 | A1 * | 9/2018 | Liu | G01R 33/10 |
| 2018/0321133 | A1 * | 11/2018 | Allen | G01N 27/83 |
| 2018/0356365 | A1 * | 12/2018 | Liu | G01N 27/82 |
| 2019/0056355 | A1 | 2/2019 | Amineh | E21B 12/02 |
| 2019/0064116 | A1 * | 2/2019 | Liu | G01N 27/82 |
| 2019/0072522 | A1 * | 3/2019 | Desjardins | G01R 33/07 |
| 2019/0145931 | A1 * | 5/2019 | Feng | G01N 27/83 324/222 |
| 2019/0145932 | A1 * | 5/2019 | Feng | G01N 29/2412 324/226 |
| 2019/0145933 | A1 * | 5/2019 | Feng | G01N 27/904 324/220 |
| 2020/0208769 | A1 * | 7/2020 | Du | F16L 55/28 |

FOREIGN PATENT DOCUMENTS

| | | |
|---|---|---|
| JP | H11-83842 A | 3/1999 |
| JP | 2744942 B2 | 7/2018 |
| RU | 2097649 C1 | 11/1997 |
| RU | 2102738 C1 | 1/1998 |
| RU | 2149254 C1 | 5/2000 |
| WO | 1998016842 A1 | 4/1998 |
| WO | 1999040724 A1 | 8/1999 |
| WO | 2003058545 A1 | 7/2003 |
| WO | 2012103541 A1 | 8/2012 |
| WO | 2012174057 A1 | 12/2012 |
| WO | 2014018844 A1 | 1/2014 |
| WO | 2015051225 A1 | 4/2015 |

(56) References Cited

FOREIGN PATENT DOCUMENTS

| WO | WO-2015051225 A1 | * | 4/2015 | ............ G01M 3/40 |
| --- | --- | --- | --- | --- |
| WO | 2015187923 A1 | | 12/2015 | |
| WO | 2016094775 A1 | | 6/2016 | |
| WO | WO-2016094775 A1 | * | 6/2016 | ............ G01N 27/82 |

OTHER PUBLICATIONS

International Search Report issued in International Patent Application No. PCT/US2015/065202 dated Feb. 26, 2016; 14 pages.

Christian et al., "Statistical Analysis of Coiled Tubing Fatigue Data", SPE 121457-MS, Presented at the SPE/ICoTA Coiled Tubing and Well Intervention Conference and Exhibition, the Woodlands, Texas, USA, Mar. 31-Apr. 1, 2009, 7 pages.

Newman, K. R., "Coiled Tubing Life Modeling," SPE 22820, SPE Annual Technical Conference and Exhibition, Dallas, Texas, Oct. 6-9, 1991, 7 pages.

Burgos, R., Mattos, R. F. and Bulloch, S., "Delivering Value for Tracking Coiled Tubing Failure Statistics," SPE 107098, 8 pages.

Rosen, P. M. A., "Remote Coiled Tubing Operation Monitoring", SPE 46038, 1998 SPE/ICoTA Coiled Tubing Roundtable, Houston, Texas Apr. 15-16, 1998, 7 pages.

Stanley, R. K., "Results of a New Coiled Tubing Assessment Tool," SPE 141944, 2011 SPE/ICoTA Coiled Tubing and Well Intervention Conference and Exhibition, the Woodlands, Texas, Apr. 5-6, 2011, 8 pages.

Zheng, A., Liu, Z., Zwanenburg, M., Burgos, R., Scuadroni, N., Stayer, A., "State of the Art Portable Measurement and Defect Detection Technology for Coiled Tubing," SPE 163945, 2013 SPE/ICoTA Coiled Tubing and Well Intervention Conference & Exhibition, the Woodlands, Texas, Mar. 26-27, 2013, 8 pages.

Z. Liu, G. Minerbo, and A. Zheng, "Steel coiled tubing defect evaluation using magnetic flux leakage signals", SPE 168260, Coiled Tubing & Well Intervention Conference & Exhibition (ICoTA), the Woodlands, TX, Mar. 25-26, 2014, 16 pages.

University of Tulsa, CTMRC 2011-2012 Annual Project Review, Sep. 28, 2012, 49 pages.

Padron, T, Luft. B., Kee, E., Tipton, S., "Fatigue Life of Coiled Tubing with External Mechanical Damage," SPE 107113, 2007 SPE/ICoTA Coiled Tubing and Well Intervention Conference and Exhibition, the Woodlands, Texas, Mar. 20-21, 2007, 16 pages.

Lynch, "Magnetic Flux Leakage Robotic Pipe Inspection: Internal and External Methods", Rice University, a Thesis Submitted in Partial Fulfillment of the Requirements for the Degree Master of Science, Houston, Texas, Dec. 2009, 66 pages.

Tipton, S. M., "Coiled Tubing Deformation Mechanics: Diametral Growth and Elongation", SPE 36336, ICoTA/SPE North American Coiled Tubing Roundtable, Feb. 26-28, 1996, 9 pages.

Tipton et al., "Fatigue Integrity Analysis of Rotating Coiled Tubing", SPE 100068. 2006 SPE/ICoTA Coiled Tubing and Well Intervention Conference and Exhibition, the Woodlands, TX, USA, Apr. 4-5, 2006, 7 pages.

Stanley, R. K., "New Results from Electromagnetic and Ultrasound Inspection of Coiled Tubulars", SPE 121810, SPE/ICoTA Coiled Tubing and Well Intervention Conference and Exhibition, Mar. 31-Apr. 1, 2009, 8 pages.

International Search Report and Written Opinion issued in International Patent Appl. No. PCT/US2017/022620 dated Jun. 12, 2017; 12 pages.

Jiang, Q., Experimental Study of Interference Factors and Simulation on Oil-Gas Pipeline Magnetic Flux Leakage Density Signal, Proceedings of the 2007 IEEE International Conference on Mechatronics and Automation, Harbin, China, 2007, pp. 3652-3656.

* cited by examiner

FATIGUE LIFE ASSESSMENT

CROSS-REFERENCE TO RELATED APPLICATION

The present document is based on and claims priority to U.S. Provisional Application Ser. No. 62/265,350 filed Dec. 9, 2015, which is incorporated herein by reference in its entirety.

BACKGROUND

Coiled tubing technology has been used in an expanding range of applications since its introduction to the oil industry in the 1960s. The wide array of tools and technologies that can be used in cooperation with coiled tubing and the ability of coiled tubing to pass through completion tubulars makes the technology very versatile. A coiled tubing system may include surface pumping facilities, a coiled tubing string mounted on a reel, an injector head or other mechanism to convey the coiled tubing into and out of the wellbore, and a surface control apparatus at the wellhead. The coiled tubing may be deployed in wellbores to facilitate performance of well treatment and/or well intervention operations, e.g. operations comprising hydraulic fracturing, matrix acidizing, milling, perforating, coiled tubing drilling, or other downhole operations.

The use of coiled tubing in the oilfield regularly subjects the coiled tubing to severe cyclic plastic deformation. As a result, low cycle fatigue may be a major limiting factor with respect to the useful life (fatigue life) of the coiled tubing. Regular use of the coiled tubing also subjects the tubing to potential damage factors, such as mechanical damage due to surface equipment, corrosion due to storage for treating fluids, abrasion due to contact with downhole completions, and/or erosion due to flowing fluids. At least some of the coiled tubing failures are attributable to the defects, e.g. mechanical damage, fatigue, corrosion, and/or manufacturing defects. Available coiled tubing inspection technologies often rely on alarm thresholds combined with human intervention but such approaches have limited capability with respect to estimating future run life.

SUMMARY

In general, the present disclosure provides a methodology and system for estimating remaining cycles of a pipe with the presence of a defect. Data relating to the defect is provided to a data processing system for comparison to stored data regarding defects. Additionally, data regarding fatigue life accumulation is stored on the data processing system and pertains to the fatigue life of the pipe based on the number of cycles that may be experienced by the pipe without the presence of the defect. The number of cycles experienced by the pipe at the time the defect occurs in the pipe also is determined and provided to the data processing system. The system and methodology further comprise using the data regarding the defect type, defect severity in terms of fatigue life reduction, the fatigue life accumulation data for the pipe without considering defects, and the number of cycles already experienced by the pipe at the time of the defect occurrence to estimate a remaining number of cycles until failure of the pipe. The estimate may then be output to a device to facilitate decision-making with respect to future use of the pipe.

BRIEF DESCRIPTION OF THE DRAWINGS

Certain embodiments will hereafter be described with reference to the accompanying drawings, wherein like reference numerals denote like elements. It should be understood, however, that the accompanying figures illustrate various implementations described herein and are not meant to limit the scope of various technologies described herein, and.

DETAILED DESCRIPTION

Figure 1:
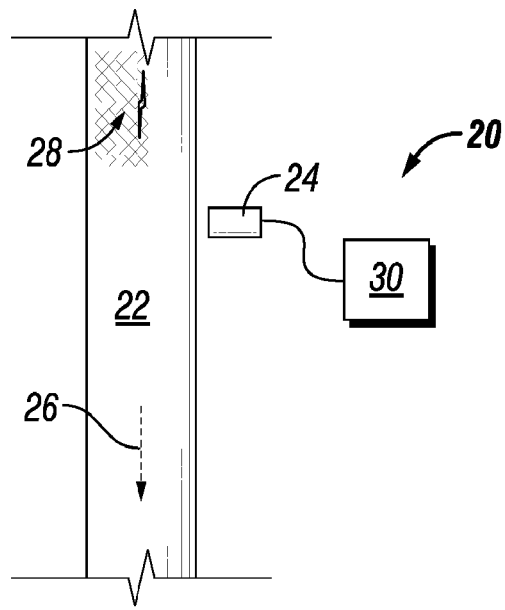
FIG. 1 is a schematic illustration of an example of a pipe defect assessment system for evaluating pipe, e.g. coiled tubing, according to an embodiment of the disclosure.

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a methodology and system for monitoring pipe to detect the presence of a defect and to estimate the future run life, e.g. number of cycles, remaining with respect to the pipe given the presence of the defect. Data relating to the defect is provided to a data processing system for comparison to stored data regarding defects. Additionally, data regarding fatigue life accumulation may be stored on the data processing system. The fatigue life accumulation data pertains to the fatigue life of the pipe based on the number of cycles to failure that may be experienced by the pipe without the presence of the defect.

The number of cycles experienced by the pipe at the time the defect occurs in the pipe also is determined and provided to the data processing system. The system and methodology further comprise combining and using the data on the defect regarding the defect type, the fatigue life accumulation data for the pipe, and the number of cycles experienced by the pipe at the time of the defect to estimate a remaining number of cycles until failure of the pipe. The estimate may then be output to a device to facilitate decision-making with respect to future use of the pipe. In various applications, the system and methodology may be used for run life estimate of pipe in the form of coiled tubing.

According to embodiments described herein, the technique may be used for pipe fatigue assessment, e.g. coiled tubing fatigue assessment, which comprises considering the effect(s) of localized damage to the coiled tubing based on magnetic flux leakage measurements. Embodiments described herein utilize a model which employs a combination of computer modeling of pipe fatigue, e.g. coiled tubing fatigue, without considering effects of defects/damage to the pipe. This data may be combined with fatigue life degradation data which results from localized damage due to the defect as measured by a suitable sensor, such as an MFL inspection device.

The model provides an enhanced and more accurate assessment of coiled tubing fatigue life to facilitate estimates of the remaining run life, e.g. cycles, with respect to the pipe. The methodology enables use of nondestructive inspection technologies rather than relying on manual inspection to provide useful estimates of pipe fatigue life in the presence of localized damages to the pipe.

In various embodiments, the coiled tubing or other pipe is monitored to detect the presence of a defect via one or more magnetic flux leakage sensors. Magnetic flux leakage utilizes a magnetic field to magnetize the coiled tubing or other pipe. In areas of defects, e.g. material discontinuity, corrosion pit, mechanical damage, metal loss, the magnetic field leaks from the metal. Measurements of this magnetic flux leakage field may then be used to infer the underlying defect in the pipe.

Referring generally to FIG. 1, an example of a pipe defect assessment system 20 for evaluating pipe 22, e.g. jointed pipe or coiled tubing, is illustrated. It should be noted that the embodiments described herein may be employed in well or non-well related applications. Additionally, the pipe defect assessment system 20 may comprise a variety of pipe support systems, pipe delivery systems, sensor arrangements, local and/or remote processing systems, data evaluation algorithms, models, and/or other software programs, as well as other components arranged in various configurations depending on the parameters of a pipe damage assessment application.

In FIG. 1, an embodiment of the pipe defect evaluation system 20 is illustrated as moving pipe 22 past an appropriate sensor or sensors 24. In embodiments described herein, the sensor or sensors 24 may comprise magnetic flux leakage (MFL) sensors which monitor magnetic flux leakage. The relative movement of pipe 22 is indicated by arrow 26, however some embodiments may be constructed to move the sensor or sensors 24 along a stationary pipe 22. Additionally, both the pipe 22 and the sensor(s) 24 may be moved relative to each other.

Each sensor 24 may be positioned to monitor for the presence of a magnetic flux leakage signal associated with a defect 28 and to output sensor data to a data processing system 30. The signals provided by sensor 24 change upon detection of the differing magnetic flux leakage signal associated with the defect or defects 28. The changes in that sensor data can be processed via data processing system 30 to, for example, quantify defect shape, size, and/or severity which can then be used in combination with other data to estimate a fatigue life, e.g. a number of remaining cycles, with respect to the coiled tubing or other pipe.

The presence of a defect on coiled tubing affects its mechanical integrity by, for example, reducing its tensile load capacity, reducing its pressure containment capacity, and reducing its fatigue life. The fatigue life may be diminished because the presence of a defect often acts as a stress riser which can lead to development of fatigue cracking in coiled tubing or other pipe. By utilizing sensor or sensors 24, magnetic flux leakage changes may be monitored to determine whether the magnetic flux leakage signal, e.g. signature, begins to indicate characteristics associated with the defect. The magnetic flux leakage signal data is relayed from the sensor 24 to the data processing system 30 for evaluation, as described in greater detail below. The sensor(s) 24 may be used at a wellsite or at an off-site facility for testing pipe 22.

In the example illustrated, sensor or sensors 24 detect magnetic flux leakage but the sensors 24 may be combined with other types of sensors positioned to help detect and analyze a desired defect or defects along pipe 22. In some embodiments sensor 24 may comprise a single sensor but sensor 24 also may comprise a plurality of sensors or sensor elements arranged longitudinally and/or circumferentially. In a specific embodiment, sensor 24 comprises a plurality of magnetic flux leakage sensing elements positioned to detect along the circumference of pipe 22 as pipe 22 and sensor(s) 24 are moved relative to each other. In various testing applications, pipe 22 is in the form of coiled tubing which moves relative to the sensor. In other applications, however, pipe 22 may comprise individual pipe joints or other types of pipes which are moved relative to the sensor.

Data obtained by the sensor or sensors 24 is transmitted to processing system 30. The processing system 30 may be located in whole or in part at a well site, at a well testing facility, and/or at a remote location. After processing data from each sensor 24, the processing system 30 may be used to display or otherwise output results related to the detection and evaluation of magnetic flux leakage signal data corresponding with defect 28. The raw and/or processed data may be sent to other systems and other locations for continued processing, analysis, and/or control operations.

Figure 2:
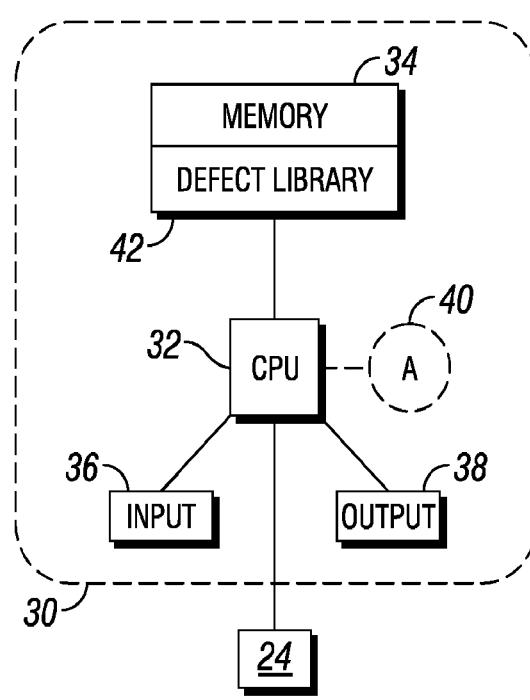
FIG. 2 is a schematic illustration of a processor-based system for evaluating sensor data obtained while evaluating pipe and data stored for enabling improve estimation of remaining run life of the pipe, according to an embodiment of the disclosure.

Referring generally to FIG. 2, an example of processing system 30 is illustrated. In this example, processing system 30 is in the form of a computer-based system having a processor 32, such as a central processing unit (CPU). The processor 32 is coupled with sensor or sensors 24 and is operatively employed to intake magnetic flux leakage signal data related to defects 28 and then to process the data, e.g. run appropriate models and/or algorithms. For example, the data may be processed to find similar stored signal data correlated with specific types of defects 28, e.g. defects of a certain size, type, and/or shape. The processor 32 also may be operatively coupled with a memory 34, an input device 36, and an output device 38. In some embodiments, the connection between sensors 24 and processing system 30 may be indirect. For example, data from the sensor or sensors 24 may be collected and subsequently downloaded to processing system 30.

In some applications, desired data may be stored in memory 34 and the processor 32 may be used to run selected algorithms/models, e.g. comparisons with stored correlations, via a software module 40. For example, the software module 40 may be used to process the data on the defect regarding the defect type in combination with fatigue life accumulation data for the pipe 22, e.g. coiled tubing, and the number of cycles experienced by the coiled tubing at the time the defect occurred. The software module 40 also may be utilized in processing other data, such as the wellbore depth at which the defect will be deployed during a job and the pressures to which the pipe section containing the defect will be subjected during the job. The various data may be collected in a library 42 (which may include a pre-established benchmark or defect library) for use by processor 32. For example, data on the defects 28 may be stored in library 42. Additionally, the library 42 may include selected attributes, e.g. a defect photo and a corresponding magnetic flux leakage signal or "defect signature" representing a specific type of defect 28.

The software module 40 may further comprise, for example, algorithms employed in computer models to provide the desired methodology for evaluating defect severity in combination with the fatigue life accumulation data, time of defect occurrence, depth data, pressure data, and/or other data utilized in combination to estimate a remaining number of cycles until failure of the coiled tubing or other type of pipe. Software module 40 may comprise many types of models, algorithms, and programs selected according to the types of sensors 24, environmental considerations, types of defects anticipated, and/or other parameters.

An embodiment of the software module 40 may comprise a model or a plurality of models as part of the software module. Such models may comprise a fatigue life accumulation model and a defect severity evaluation model. The fatigue life accumulation model in the software module 40 considers, for example, the loading history of the coiled tubing 22, including pressure, bending radius, fatigue cycles, experienced by coiled tubing 22 in operation, in combination with physical and/or mechanical tubing characteristics such as diameter, wall thickness, materials grade, bias welding, and the like. The defect severity evaluation model in the software module 40 utilizes predetermined calibrations established between magnetic flux leakage intensity and fatigue life ratio. This relationship data enables the estimation of a reduction in cycles to failure due to defect 28 after determining the defect type via, for example, a defect recognition program that matches the detected defect 28 against a pre-established benchmark defect library, such as the library 42. Both the fatigue life accumulation and defect severity evaluations models have been verified and validated against statistically sufficient testing data collected during laboratory testing and from the oil field operational data. One way to estimate the time of defect occurrence in the software model 40 is through continuous monitoring of coiled tubing 22 during its field deployment to identify the stage at which the defect 28 occurred.

Figure 3:
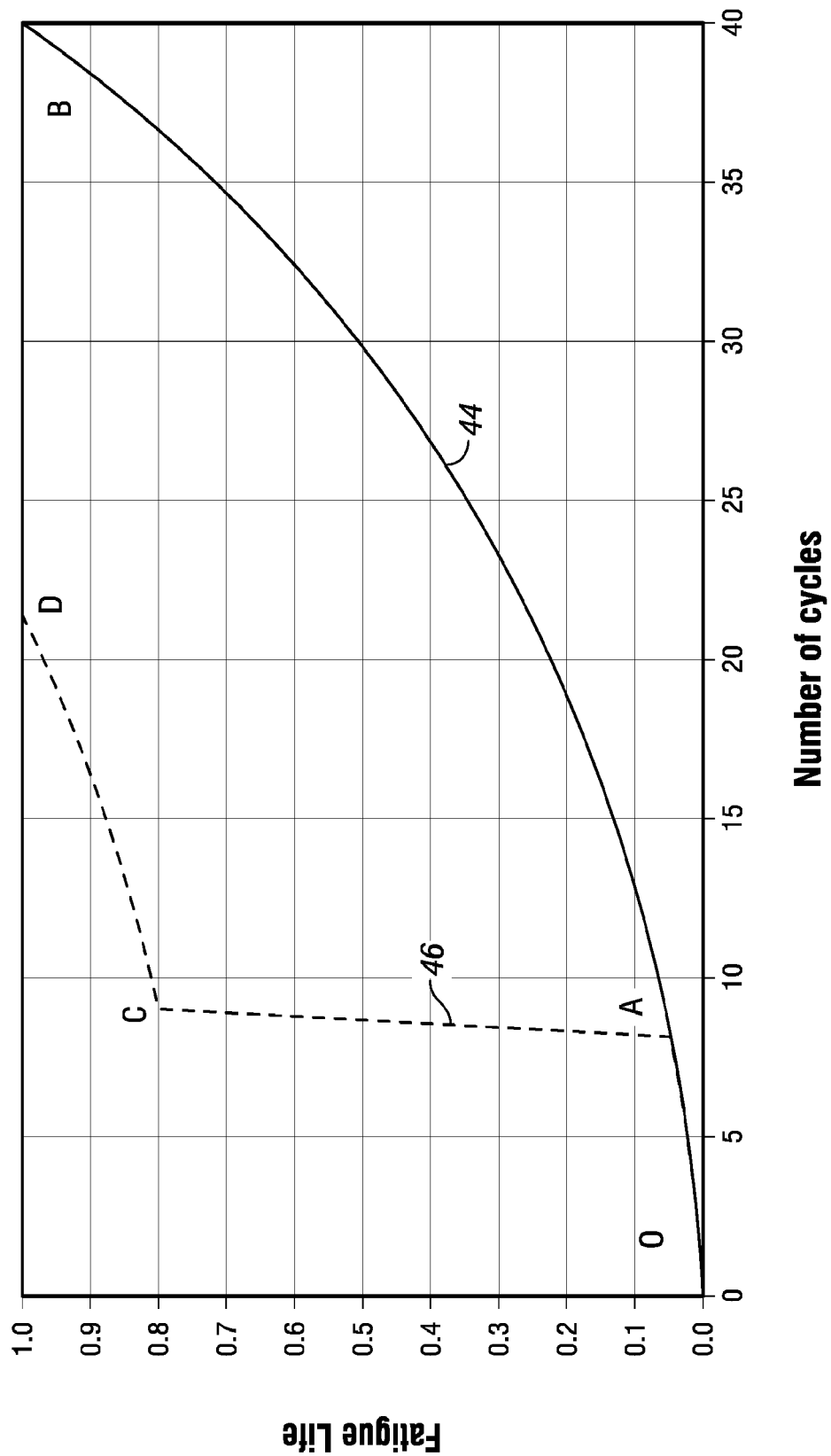
FIG. 3 is a graphical representation illustrating fatigue life of a pipe versus number of cycles experienced by the pipe as well as the occurrence of a defect in the pipe, according to an embodiment of the disclosure.

The data regarding fatigue life accumulation for a given pipe 22, e.g. coiled tubing, without defect 28 may be acquired via data accumulated during testing and/or actual use of a specific type of coiled tubing or other pipe 22. An example of fatigue life accumulation data for a given type of coiled tubing 22 is provided in the graph illustrated in FIG. 3. In FIG. 3, the graph demonstrates fatigue life accumulation data and other data which may be used to predict the number of cycles to failure during coiled tubing fatigue. In the illustrated graph, the horizontal axis represents the number of cycles to failure of the coiled tubing 22, and the vertical axis is the accumulating fatigue life. When the fatigue life reaches 1, the specific type of coiled tubing 22 or other pipe 22 is predicted to fail due to fatigue.

In the graph of FIG. 3, a graph line 44 represents the fatigue life accumulation for coiled tubing 22 without defect 28. The fatigue life represented by graph line 44 starts with a fatigue life of 0 at point O until cycled all the way to failure represented by a fatigue life of 1 at point B. A dashed line 46 represents, in part, the fatigue life accumulation data for this type of coiled tubing 22 cycled a certain number of cycles without defect (from point O to point A). At point A, the coiled tubing 22 was subjected to defect 28 which caused a sudden increase in the fatigue life as represented by the movement along graph line 46 from point A to point C. In the graphical example, the coiled tubing 22 was then cycled all the way to failure after occurrence of the defect 28, as represented by the graph line segment from point C to point D.

The number of cycles to failure for a given pipe 22 may be determined based on the data represented by the appropriate graph, such as the graph illustrated in FIG. 3. The fatigue life data and its defect data represented by such graphs regarding specific pipes 22, e.g. specific types of coiled tubing, may be stored for processing by processing system 30. As illustrated in the graph, the subject pipe 22 reaches fatigue life of 1 at point B, corresponding to 40 fatigue cycles, when the pipe 22 is used without defect 28. For the same pipe 22 with defect 28 imposed at point C, corresponding to 8 cycles, the fatigue life reaches 1 at point D, corresponding to 22 cycles in total. The data represented by graph line 44, the type of defect 28 to cause a shift to point C, and the number of cycles prior to occurrence of defect 28, is used via processing system 30 to estimate a remaining number of cycles until failure of the pipe 22. The model relationships and/or model algorithms for determining graph line 44 as well as points A, C, D may be determined based on testing and/or recordation of actual results due to cycling and failure of the specific types of pipe 22 with specific types of defects 28.

Using such modeling based on, for example, historical data assembled to provide the appropriate model for a given pipe, the prediction regarding run life, e.g. remaining cycles for pipe 22, matches well with subsequent testing data. The table below provides a comparison between estimates regarding remaining cycles predicted by the model and actual test results. In this example, the testing was performed on a standard 2 inch diameter coiled tubing pipe under 7600 psi pressure and with different numbers of cycles prior to occurrence of the defect.

| Testing scenario | Sample # | Testing results (cycles) | Model results (cycles) |
| --- | --- | --- | --- |
| Without defect | # 01 | 37.5 | 40 |
|  | # 02 | 37.5 |  |
|  | # 03 | 35.5 |  |
|  | # 04 | 39 |  |
| With defect, 0% prior cycles | # 05 | 18.5 | 20 |
|  | # 06 | 18.5 |  |
|  | # 07 | 19.5 |  |

| Testing scenario | Sample # | Testing results (cycles) | Model results (cycles) |
| --- | --- | --- | --- |
| With defect, 20% prior cycles | # 08 | 18 | 22 |
|  | # 09 | 22 |  |
|  | # 10 | 22 |  |
| With defect, 40% prior cycles | # 11 | 26 | 25 |
|  | # 12 | 26.5 |  |
|  | # 13 | 25 |  |
| With defect, 60% prior cycles | # 14 | 29 | 29 |
|  | # 15 | 28 |  |
|  | # 16 | 28 |  |

Testing also may be employed to validate the model. Embodiments of the validated model may then be readily applied to assess the fatigue life of used coiled tubing strings in the field. Use of the validated model for specific types of pipe 22, with specific types of defects 28, combined with, for example, knowledge of the time of occurrence of the defect 28, the wellbore depth at which the pipe section containing the defect 28 is utilized, the pressures to which the pipe section containing the defect is subjected, and/or the bending radius against which the pipe section is fatigued, may be processed via processing system 30. For example, the data may be processed according to the appropriate model embodied in software module 40, thus enabling an estimation of useful life of the pipe, e.g. remaining cycles.

Figure 4:
FIG. 4 is an illustration of examples of defects which can occur in the pipe in combination with magnetic flux leakage (MFL) defect signatures associated with the specific defect as detected by an MFL sensor, according to an embodiment of the disclosure.
Figure 4:
Figure 4:
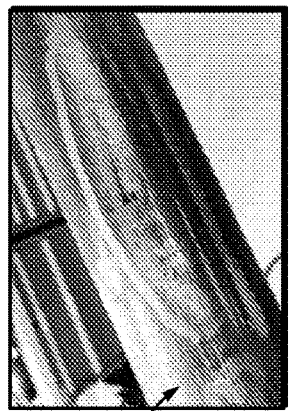
Figure 4:
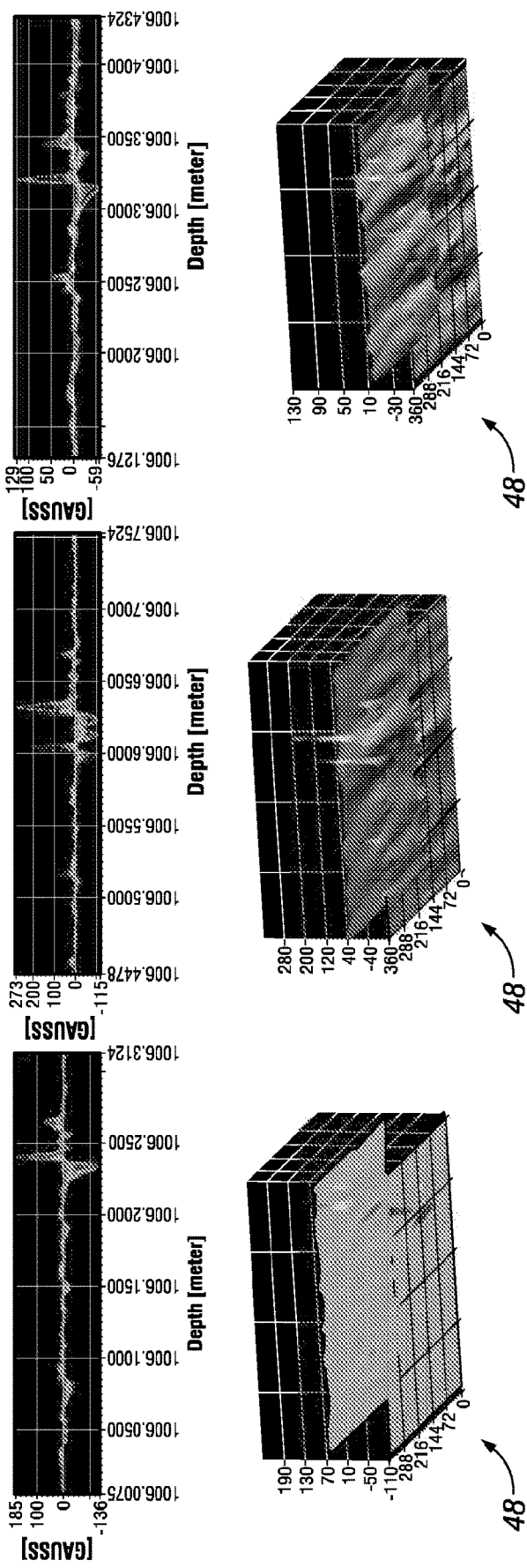

In one example in which the model was tested, the pipe 22 was in the form of a coiled tubing string used for hydraulic fracturing operations. Examples of services and/or run types include cement bond logs, cleanout runs, milling operations, sleeve shifting, perforating, fishing, and plug setting. In this example, the sensor 24 was in the form of an MFL device used to monitor the coiled tubing 22 for proper operation. A group of mechanical defects 28 was detected by the sensor 24, and illustrations of such defects 28 are provided in FIG. 4. FIG. 4 also illustrates the corresponding magnetic flux leakage signals in the form of high-resolution surrounding MFL fields 48.

Figure 5:
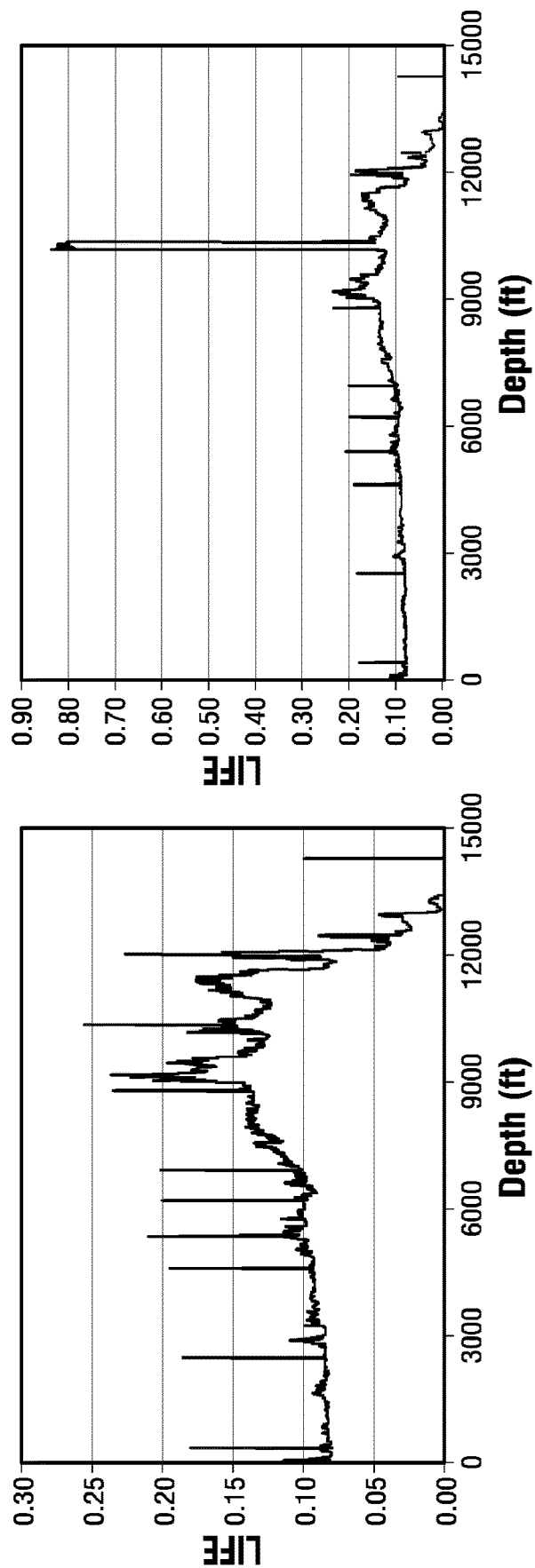
FIG. 5 is a graphical representation illustrating fatigue life of pipe with and without a defect versus depth, according to an embodiment of the disclosure.

The baseline fatigue life of the coiled tubing 22 when the defects 28 were first detected is illustrated in the left side graph of FIG. 5. This baseline fatigue life may be determined based on prior test data and/or modeling, as described above. Once the defects 28 occurred, the fatigue life of the coiled tubing 22 became substantially degraded, as predicted by the modeling and as illustrated in the right side graph of FIG. 5. The estimate of remaining run life may be output to a suitable output device 38 for review by an operator. This facilitates decision-making by field operations for continued use of the coiled tubing 22 accompanied by real-time monitoring via sensor 24 according to the estimated remaining number of cycles.

Figure 6:
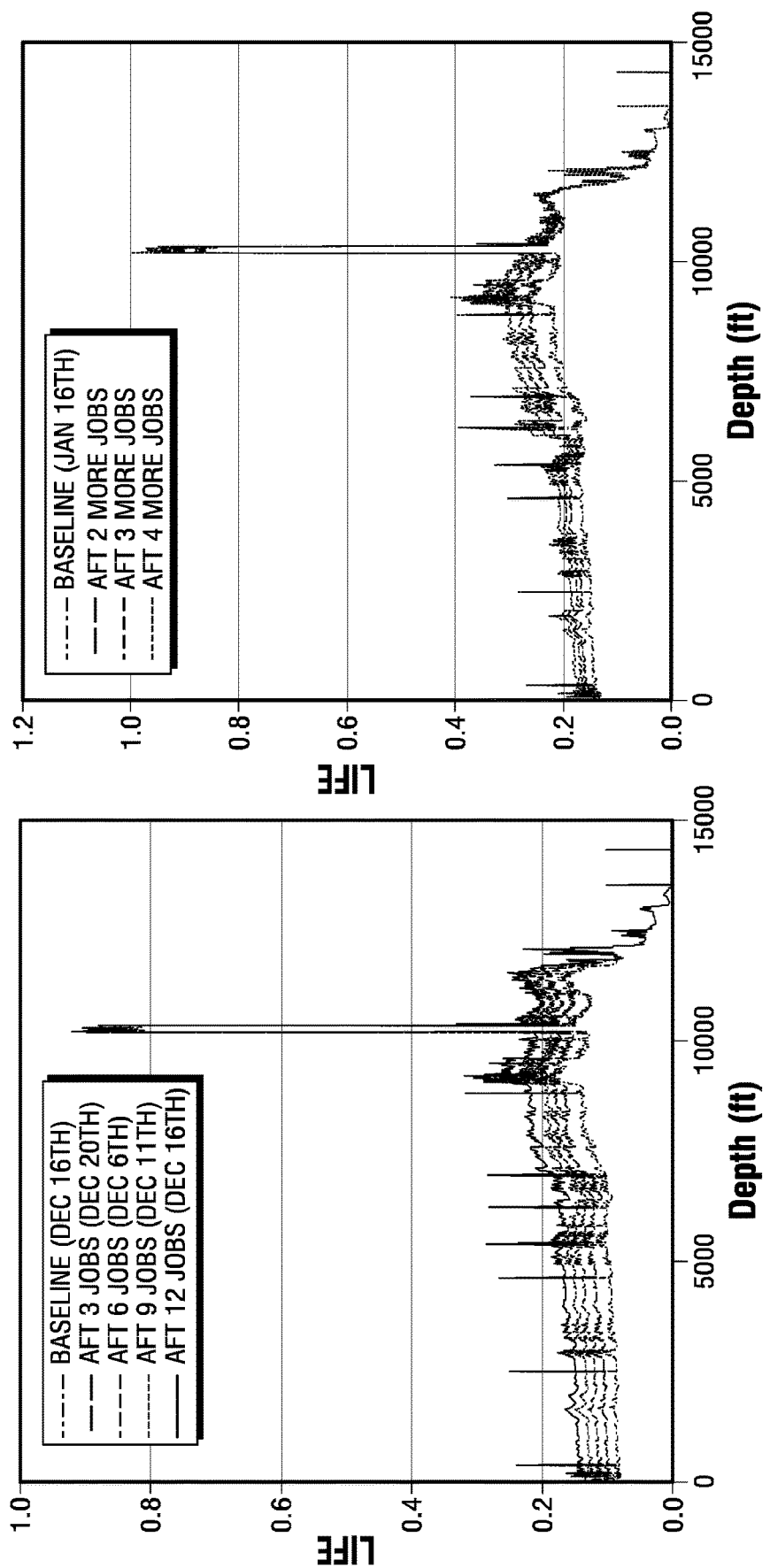
FIG. 6 is a graphical representation illustrating fatigue life versus depth for a plurality of jobs, according to an embodiment of the disclosure.

In this example, the estimated remaining number of cycles until failure of the coiled tubing 22 indicated by the model suggested an additional 12 jobs/cycles could be accomplished without failure of the coiled tubing 22. The fatigue life evolution is plotted in the left side graph of FIG. 6 for those 12 jobs completed with defects 28 in coiled tubing 22. It should be noted the max fatigue life is still within the failure limit after these 12 jobs. Thus, the fatigue life may be further evolved, as represented by the right side graph of FIG. 6, in the event use of the coiled tubing 22 is continued after the 12 cycles. According to the data processed via processing system 30, the coiled tubing 22 is estimated to operate for three more cycles without failure.

Figure 7:
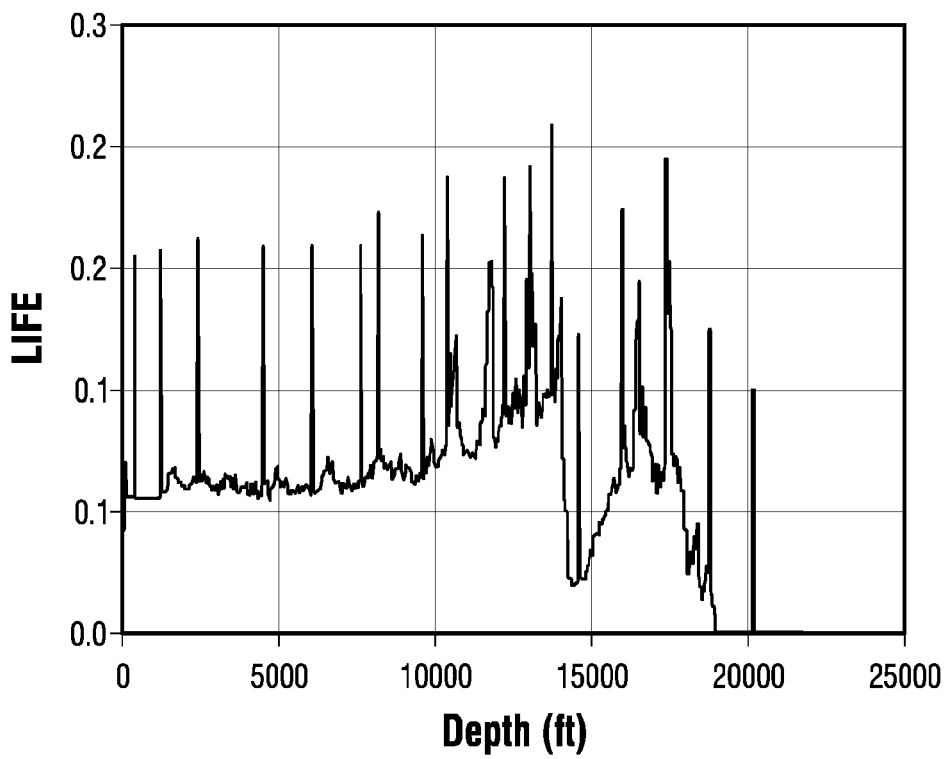
FIG. 7 is a graphical representation illustrating fatigue life versus depth for a specific pipe, according to an embodiment of the disclosure.
Figure 8:
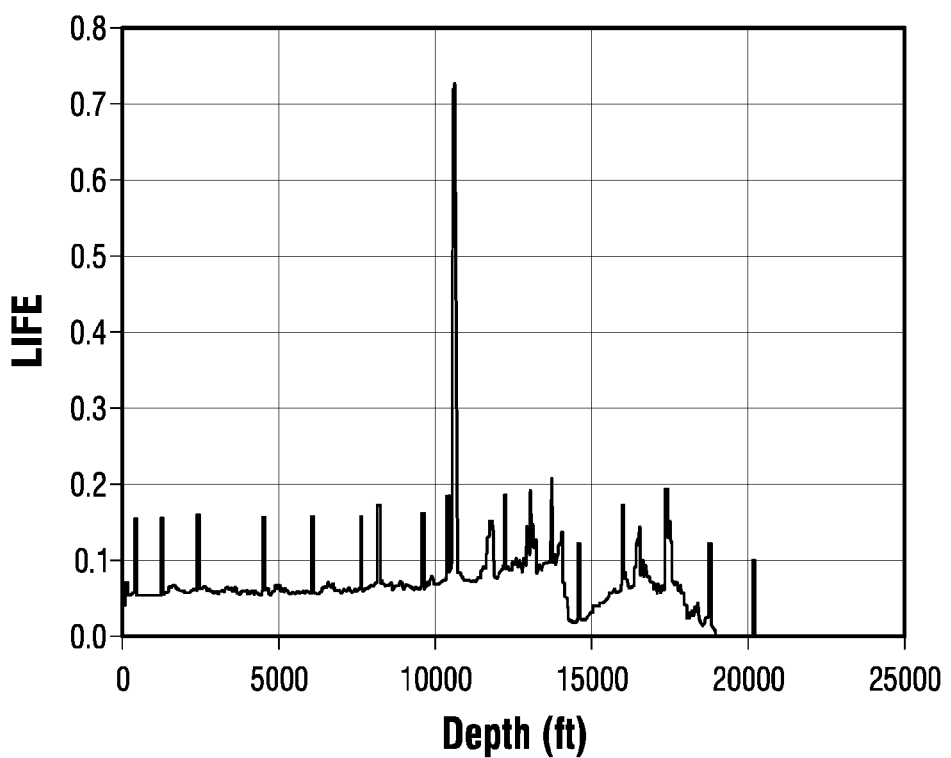
FIG. 8 is a graphical representation illustrating degraded fatigue life versus depth resulting from a defect, according to an embodiment of the disclosure.

In another example, the pipe 22 was in the form of an 80 ksi coiled tubing string having a specific defect 28 detected by the MFL device/sensor 24. When the defect 28 was first detected, the coiled tubing 22 had a baseline fatigue life illustrated by the graph shown in FIG. 7. Based on the type of defect 28 detected, the methodology described herein was used to assess an estimated degraded fatigue life as represented in FIG. 8. As described above, the methodology used to form the estimate superimposed a fatigue life reduction (determined based on magnetic flux leakage signal measurements of the specific defect 28) on the fatigue life for this type of coiled tubing 22 without defect. (See description of FIG. 3 above).

Figure 9:
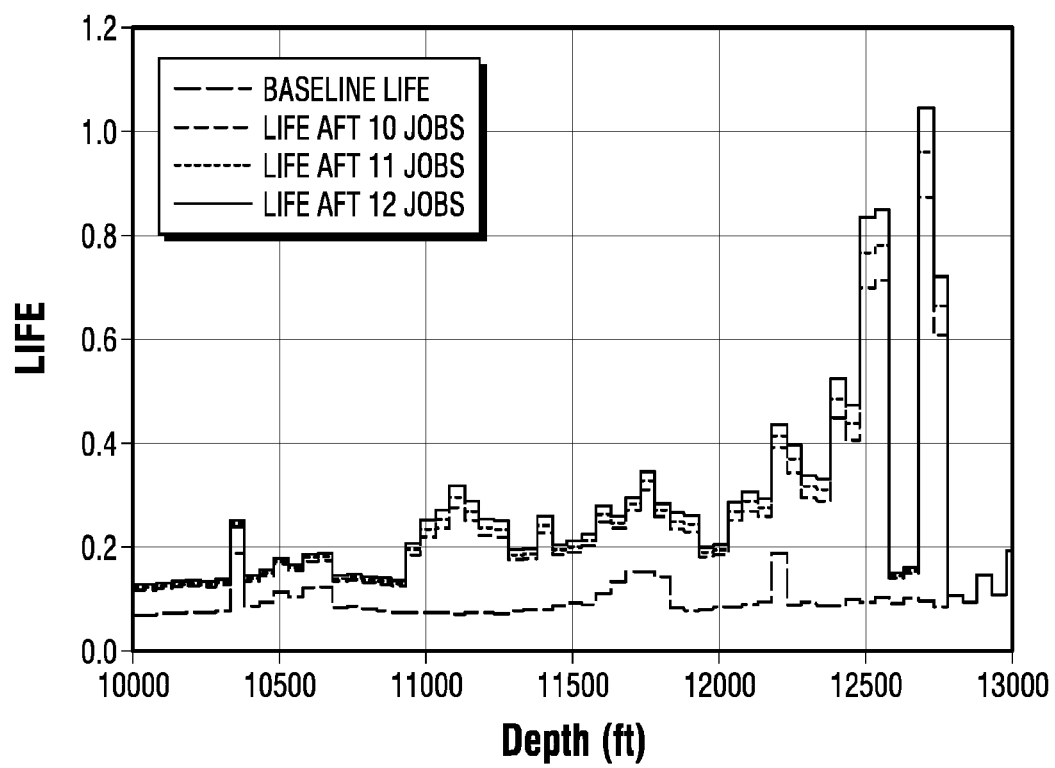
FIG. 9 is a graphical representation of an example of fatigue life evolution versus depth, according to an embodiment of the disclosure.
Figure 10:
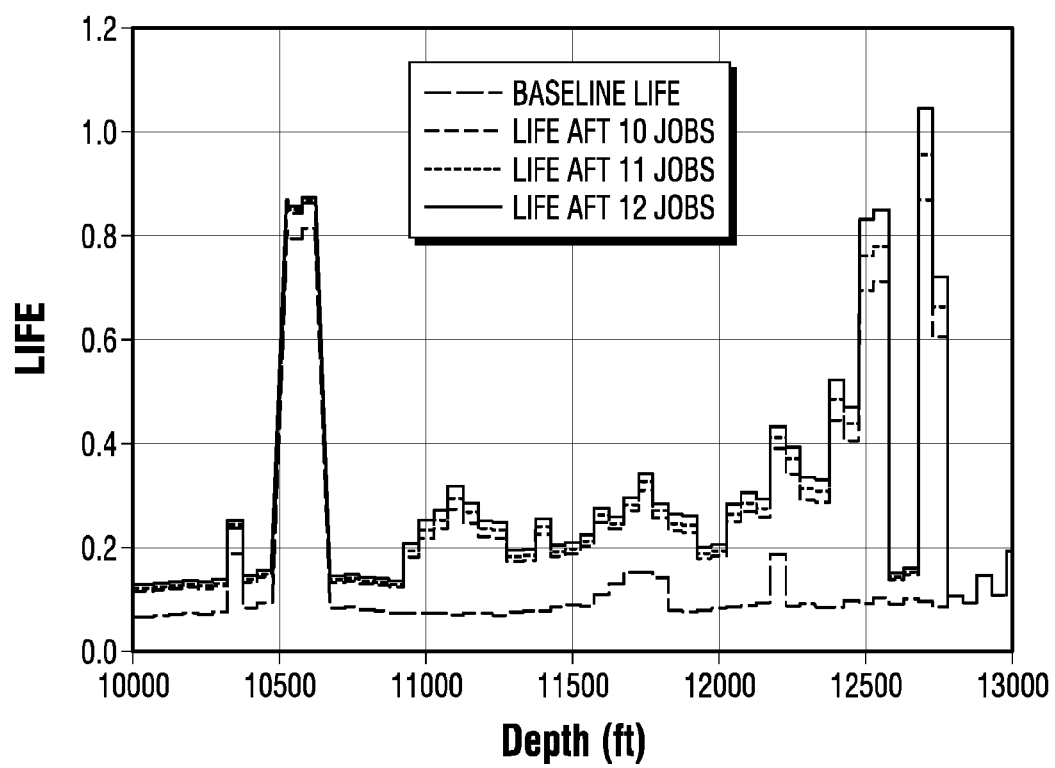
FIG. 10 is a graphical representation of an example of fatigue life evolution versus depth in the presence of a given defect, according to an embodiment of the disclosure.

Given a sequence of loading for a normal cleanout operation, the baseline fatigue life for this type of coiled tubing 22 evolves as illustrated graphically in FIG. 9. In this particular example, the plot shown in FIG. 9 has been zoomed in on a depth interval between 10,000 feet and 13,000 feet because this interval has the highest fatigue life in this particular operation. Without incurring defect 28, the coiled tubing 22 is projected to fail after 11 typical jobs, as further illustrated in FIG. 9. When the coiled tubing 22 is subjected to the same loading sequence, the fatigue life evolution upon occurrence of the specific defect 28 is illustrated graphically in FIG. 10.

For this particular case, occurrence of the defect 28 does not substantially reduce the total number of runs, e.g. cycles, to failure (according to the model and according to the actual usage). In part, the reduced effects of the defect can be attributed to the location of the defect during operation at a depth outside the interval having the highest fatigue life. Consequently, the portion of coiled tubing 22 having defect 28 did not experience the high level of pressurized loading repeatedly applied during operations; and thus the estimate of remaining number of cycles until failure was not substantially reduced in this particular case.

Figure 11:
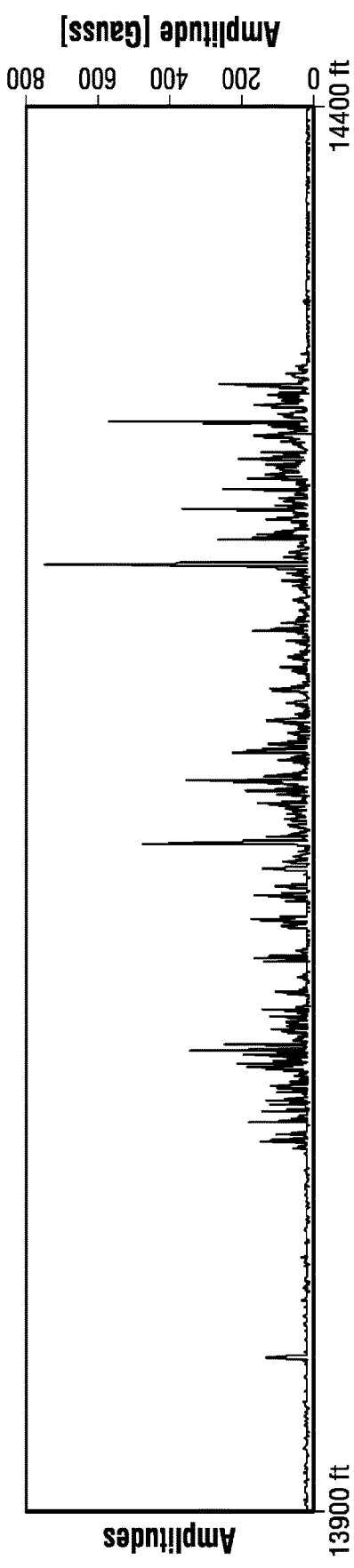
FIG. 11 is a graphical representation of magnetic flux leakage amplitude intensity and typical MFL defect signatures for defects at different depths, according to an embodiment of the disclosure.
Figure 11:
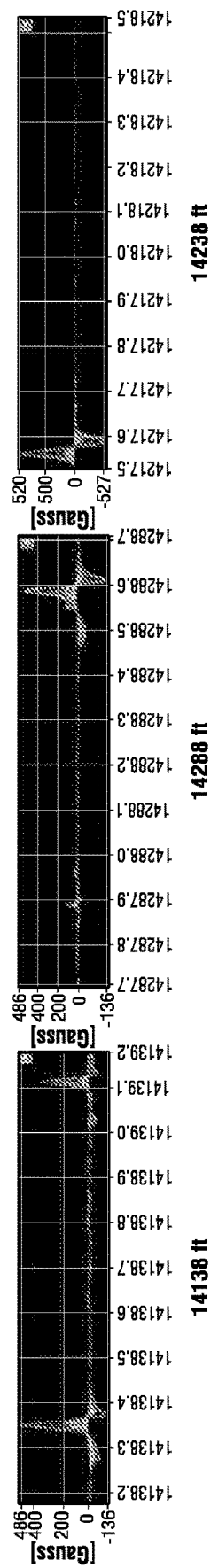
Figure 11:
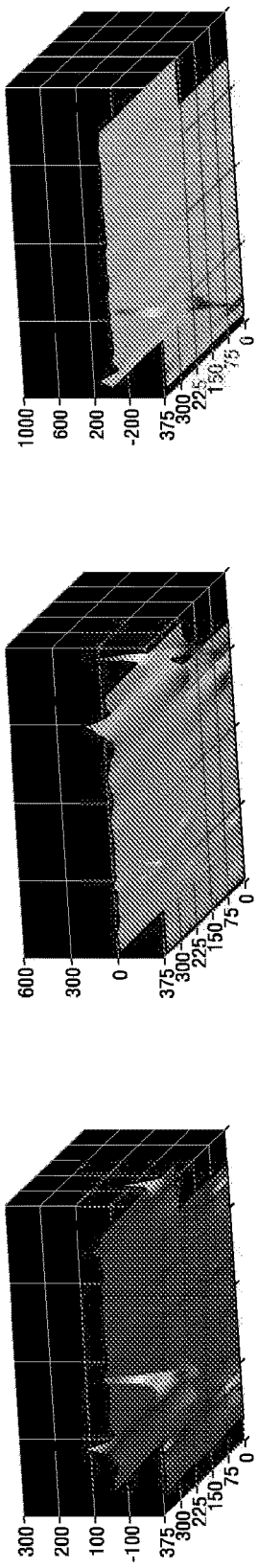

In another non-limiting example, the pipe 22 was in the form of a 90 ksi coiled tubing string having a relatively large number of densely populated mechanical defects 28 located along the coiled tubing 22 at a depth interval from 13,900 feet to 14,400 feet during operation. The MFL signal representing the defects 28 distributed in a 500 foot interval of coiled tubing 22 is represented in the upper portion of FIG. 11. As illustrated, the magnetic flux leakage intensity level or amplitude reached nearly 800 gauss, thus indicating severe defects 28. The bottom portion of FIG. 11 provides a few examples of detailed MFL distributions corresponding with specific defects 28. When modeled as described herein, such data indicates the potential for imminent failure of coiled tubing 22. Accordingly, an operator is provided guidance in deciding to withdraw the coiled tubing string 22 from service.

Figure 12:
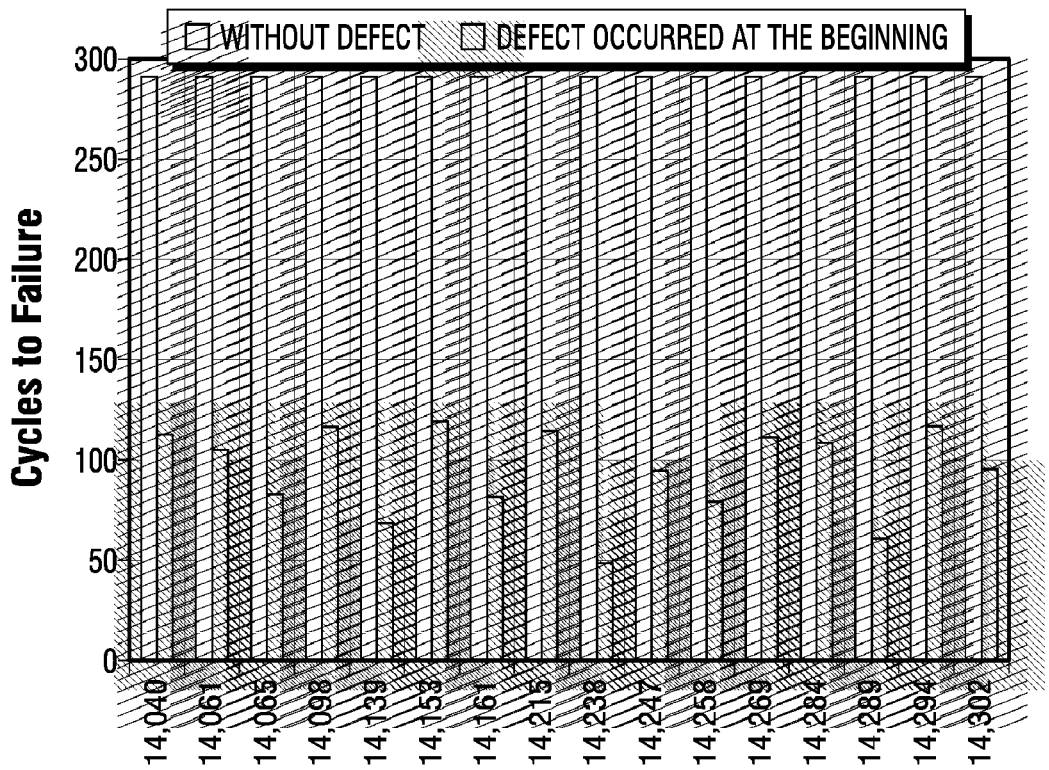
FIG. 12 is a graphical representation indicating predicted cycles to failure for a pipe with and without a defect, according to an embodiment of the disclosure.
Figure 13:
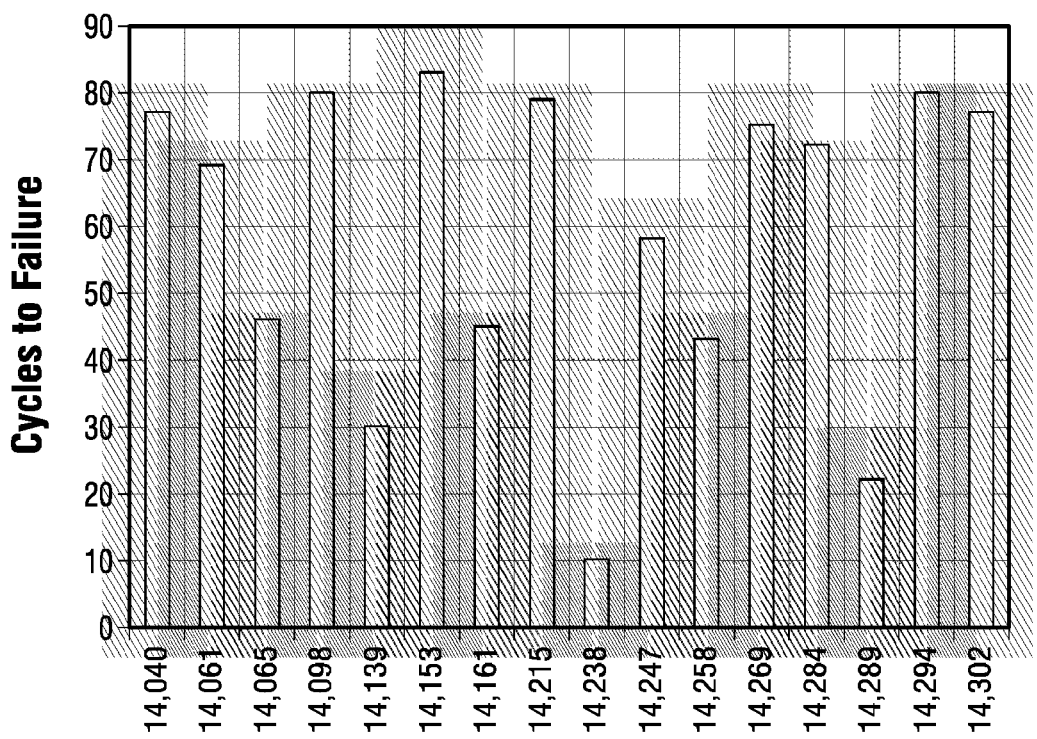
FIG. 13 is a graphical representation which is output to indicate an estimate predicting the remaining cycles before failure of the pipe, according to an embodiment of the disclosure.

When severity of a group of defects 28 in this non-limiting example is to be assessed, different levels of baseline fatigue life can be assumed to enable performance of parametric studies. FIG. 12, for example, graphically illustrates a comparison of predicted cycles to failure with and without defects 28. In this particular example, the defects 28 occurring at the beginning of field deployment can reduce the cycles to failure by more than 50%. As indicated by the data, the defect located at a depth of 14,238 feet reduces the estimated cycles to failure by more than 80%. FIG. 13 illustrates the estimated remaining cycles to failure if the defects 28 occurred when the baseline fatigue life was at 10% of the cycles predicted without defect. The results show that due to the defect at a depth of 14,238 feet, the remaining cycles to failure is estimated to be less than 10 under typical loading conditions, which information is can be used as the basis for pipe retirement decisions.

By using processing system 30 to process data regarding defect type, the fatigue life accumulation data for the pipe 22, and the number of cycles experienced by the pipe 22 at the time the defect, accurate estimates of the remaining number of cycles until failure of pipe 22 can be provided. In some applications, additional data, e.g. depth of defect 28 during usage, pressure and/or bending radius experienced by pipe 22 at the defect 28, can be useful in further enhancing the estimate of remaining cycles until failure. The estimates can be output to, for example, output device 38 for use in determining an appropriate remedial action, such as withdrawal of the pipe, repair of the pipe, or number of additional operations before such action.

The system and methodologies described herein may be employed in non-well related applications which utilize evaluation of coiled tubing, jointed pipe, and/or other tubing strings. Additionally, processes may employ a variety of sensors, data processing systems, and/or software modules for evaluating sensor data and/or making recommendations. The system may be automated to implement automatic changes to a tubing string operation based on defect data detected and evaluated. In some applications, the operational changes can be made in real time. Additionally, various types of storage databases/libraries may be constructed to accumulate many types of correlations and defect data. By way of example, the library 42 may comprise a defect library which may be automatically updated with defect entries based on defects 28 detected during evaluation of pipes, e.g. coiled tubing. Also, elements of the overall processes described herein may be performed at a variety of times and in various orders during implementation of the processes.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for assessing fatigue in a pipe string, comprising:
    providing a sensor to monitor a pipe for a magnetic flux leakage signal indicating a defect in the pipe;
    outputting data on the magnetic flux leakage signal detected by the sensor to a data processing system;
    storing fatigue life accumulation data on the data processing system regarding fatigue life of the pipe based on the number of runs experienced by the pipe without the defect;
    determining the number of runs experienced by the pipe at the time the defect in the pipe occurred;
    identifying the type of defect through defect matching with defects stored in a memory associated with the data processing system;
    using the data on the magnetic flux leakage signal indicating the defect; the identified type of defect; the fatigue life accumulation data for the pipe; and the number of runs experienced by the pipe at the time of the defect to estimate a remaining number of runs until failure of the pipe; and
    continuing to use the pipe based on the estimate.

2. The method as recited in claim 1, wherein providing a sensor to monitor the pipe comprises providing a sensor to monitor coiled tubing.

3. The method as recited in claim 1, further comprising using magnetic flux leakage defect signatures to determine the type of defect.

4. The method as recited in claim 1, wherein providing a sensor comprises providing a sensor at a wellsite.

5. The method as recited in claim 1, wherein providing a sensor comprises providing a sensor at an off-site facility used for testing the pipe.

6. The method as recited in claim 1, wherein using the data comprises using data on borehole depth of the defect during use of the pipe.

7. The method as recited in claim 1, wherein using the data comprising using data on the pressure experienced by a section of the pipe having the defect during use of the pipe.

8. A method, comprising:
    using a sensor to monitor coiled tubing to detect the presence of a defect in the coiled tubing;
    providing data regarding the defect to a data processing system for comparison to stored data regarding defect types to determine a type of the defect;
    storing fatigue life accumulation data on the data processing system regarding fatigue life of the coiled tubing based on the number of runs experienced by the coiled tubing without the defect;
    determining the number of runs experienced by the coiled tubing at the time the defect in the coiled tubing occurred;
    using the data on the defect regarding: the defect type, the fatigue life accumulation data for the coiled tubing, and the number of runs experienced by the coiled tubing at the time the defect occurred to estimate a remaining number of runs until failure of the coiled tubing; and
    outputting data on the remaining number of runs to determine future use of the coiled tubing.

9. The method as recited in claim 8, further comprising continuing to use the coiled tubing a predetermined number of runs based on the estimate.

10. The method as recited in claim 8, further comprising discontinuing use of the coiled tubing based on the estimate.

11. The method as recited in claim 8, wherein monitoring comprises using an MFL sensor.

12. The method as recited in claim 11, wherein using the MFL sensor comprises tracking magnetic flux leakage signals to detect changes in the magnetic flux leakage signals indicative of the defect.

13. The method as recited in claim 11, wherein providing data to the data processing system comprises using magnetic flux leakage defect signatures to determine the type of defect.

14. The method as recited in claim 8, wherein using the data comprises using data on borehole depth of the defect during use of the coiled tubing.

15. The method as recited in claim 8, wherein using the data comprising using data on the pressure experienced by a section of the coiled tubing having the defect during use of the coiled tubing.

16. A system for defect evaluation, comprising:
    a sensor positioned along a pipe to monitor for a magnetic flux leakage signal associated with a defect in the pipe; and
    a data processing system which obtains data from the sensor, the data processing system comprising:
        a display;
        a memory in which defect data is stored regarding the type of defect, the memory also storing fatigue life accumulation data regarding fatigue life of the pipe based on the number of runs experienced by the pipe without the type of defect; and a processor which uses a computer model to estimate a remaining number of runs until failure of the pipe based on the data on the magnetic flux leakage signal indicating the defect; the fatigue life accumulation data for the pipe; and the number of runs experienced by the pipe at the time the type of defect occurred.

17. The system as recited in claim 16, wherein the processor also utilizes data on borehole depth of the defect during use of the pipe to estimate the remaining number of runs until failure.

18. The system as recited in claim 17, wherein the processor also utilizes data on pressure experienced by the defect during use of the pipe to estimate the remaining number of runs until failure.

19. The system as recited in claim 18, wherein the pipe comprises coiled tubing.

20. The method of claim 1, wherein the runs comprise cement bond logging runs, cleanout runs, milling runs, sleeve shifting runs, perforating runs, fishing runs, or plug setting runs.

* * * * *